US010949354B2

(12) United States Patent
Anderson et al.

(10) Patent No.: US 10,949,354 B2
(45) Date of Patent: Mar. 16, 2021

(54) DISTRIBUTED SAFE DATA COMMIT IN A DATA STORAGE SYSTEM

(71) Applicant: International Business Machines Corporation, Armonk, NY (US)

(72) Inventors: Kyler A. Anderson, Sahuarita, AZ (US); Kevin J. Ash, Tucson, AZ (US); Matthew G. Borlick, Tucson, AZ (US); Lokesh M. Gupta, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 28 days.

(21) Appl. No.: 15/696,039

(22) Filed: Sep. 5, 2017

(65) Prior Publication Data

US 2019/0073311 A1 Mar. 7, 2019

(51) Int. Cl.
*G06F 12/0871* (2016.01)
*G06F 12/0868* (2016.01)
*G06F 3/06* (2006.01)

(52) U.S. Cl.
CPC ........ *G06F 12/0871* (2013.01); *G06F 3/0619* (2013.01); *G06F 3/0665* (2013.01); *G06F 3/0689* (2013.01); *G06F 12/0868* (2013.01); *G06F 2212/224* (2013.01); *G06F 2212/284* (2013.01)

(58) Field of Classification Search
CPC ........ G06F 9/50; G06F 12/08; G06F 12/0871; G06F 3/06
USPC .................. 711/118; 395/449, 471; 718/104
See application file for complete search history.

(56) References Cited

U.S. PATENT DOCUMENTS 3,930,233 A * 12/1975 Morley ................ G05B 19/056
703/14
5,636,359 A * 6/1997 Beardsley ........... G06F 12/0866
711/122

(Continued)

OTHER PUBLICATIONS

Foreground State Machine Facility for Multi-Channel Data Link Communications, IBM Technical Disclosure Bulletin. TDB No. NA9209266. vol. 35 Issue 4A, pp. 266-271 (Sep. 1, 1992). (Year: 1992).*

(Continued)

*Primary Examiner* — Mano Padmanabhan
*Assistant Examiner* — John Francis Wojton
(74) *Attorney, Agent, or Firm* — William K. Konrad; Konrad, Raynes, Davda and Victor LLP

(57) ABSTRACT

In one embodiment, a safe data commit process manages the allocation of task control blocks (TCBs) as a function of the type of task control block (TCB) to be allocated for destaging and as a function of the identity of the RAID storage rank to which the data is being destaged. For example, the allocation of background TCBs is prioritized over the allocation of foreground TCBs for destage operations. In addition, the number of background TCBs allocated to any one RAID storage rank is limited. Once the limit of background TCBs for a particular RAID storage rank is reached, the distributed safe data commit logic switches to allocating foreground TCBs. Further, the number of foreground TCBs allocated to any one RAID storage rank is also limited. Other features and aspects may be realized, depending upon the particular application.

15 Claims, 7 Drawing Sheets

(56) References Cited

U.S. PATENT DOCUMENTS

| | | | | |
|---|---|---|---|---|
| 5,896,548 | A * | 4/1999 | Ofek | G06F 3/0607 |
| | | | | 710/20 |
| 9,262,321 | B2 | 2/2016 | Benhase et al. | |
| 9,626,113 | B2 | 4/2017 | Ash et al. | |
| 9,658,888 | B2 | 5/2017 | Benhase et al. | |
| 2004/0255026 | A1 * | 12/2004 | Blount | G06F 3/0613 |
| | | | | 709/226 |
| 2014/0068189 | A1 * | 3/2014 | Benhase | G06F 9/5016 |
| | | | | 711/118 |
| 2015/0040135 | A1 * | 2/2015 | Benhase | G06F 12/128 |
| | | | | 718/104 |

OTHER PUBLICATIONS

C. Foreground State Machine Facility for Multi-Channel Data Link Communications, IBM Technical Disclosure Bulletin. TDB No. NA9209266. vol. 35 Issue 4A, pp. 266-271 (Sep. 1, 1992) (Year: 1992).*

Wikipedia, "B-Tree", (online) retrieved from the Internet on Jul. 26, 2017 form URL > http://en.wikipedia/wiki/B-tree....Total 13 pages.

IBM, "IBM KnowledgeCenter—RAID Arrays", retrieved from the Internet on Jul. 26, 2017, Total 3 pages.

IBM, "Dispatchable Units of Work: Tasks and Service Requests", (online) retrieved from the Internet on Jul. 26, 2017 at URL>https:/lwww.ibm.com/support/knowledgecenter/zosbasics/com.ibm.zos.zconcepts/zconc_dispatchable.htm, Total 2 pages.

IBM Redbooks, "DS8000 Terms and Concepts", dated May 18, 2005, (online) retrieved from the Internet on Jul. 26, 2017 at URL>http:redbooks.ibm.com/abstracts.tips0535.html...,Total 4 pages.

* cited by examiner

DISTRIBUTED SAFE DATA COMMIT IN A DATA STORAGE SYSTEM

BACKGROUND OF THE INVENTION

1. Field of the Invention

The present invention relates to a computer program product, system, and method for distributed safe data commit in data storage systems.

2. Description of the Related Art

A storage controller may control a plurality of storage devices that may include hard disks, tapes, etc. A cache may also be maintained by the storage controller, where the cache may comprise a high speed storage that is accessible more quickly in comparison to certain other storage devices, such as, hard disks, tapes, etc. However, the total amount of storage capacity of the cache may be relatively small by comparison to the storage capacity of certain other storage devices, such as, hard disks, etc., that are controlled by the storage controller. The cache may be comprised of one or more of random access memory (RAM), non-volatile storage device (NVS), read cache, write cache, etc., that may interoperate with each other in different ways. The NVS may be comprised of a battery backed-up random access memory and may allow write operations to be performed at a high speed. The storage controller may manage Input/Output (I/O) requests from networked hosts to the plurality of storage devices.

Caching techniques implemented by the storage controller assist in hiding I/O latency. The cache may comprise a high speed memory or storage device used to reduce the effective time required to read data from or write data to a lower speed memory or storage device. The cache is used for rapid access to data staged from external storage to service read data access requests, and to provide buffering of modified data. Write requests are written to the cache and then written (i.e., destaged) to the external storage devices.

NVS was introduced for allowing fast writes. Generally, in the absence of NVS, data writes may have to be synchronously written (i.e., destaged) directly to the storage device to ensure consistency, correctness, and persistence. Otherwise failure of the server may cause data stored in the cache to be lost. Generally the rate of host writes exceeds the speed of the storage devices, hence without NVS the rate of data transfer to storage devices may be slow. NVS enables fast writes to cache where the writes are mirrored to and stored safely in the NVS until the writes can be transferred to the external storage device. The data is destaged from cache later (and discarded from NVS) in an asynchronous fashion thus hiding the write latency of the storage device. The cache and NVS typically store updates intended for multiple storage devices. To guarantee continued low latency for writes, the data in the NVS may have to be drained so as to ensure that there is always some empty space for incoming writes; otherwise, follow-on writes may become effectively synchronous, which may adversely impact the response time for host writes. On the other hand, if the writes are drained too aggressively, then the benefits of write caching may not be fully exploited since the average amount of NVS cache utilized may be low.

Task Control Block (TCB) is a task control data structure in the operating system kernel containing the information needed to manage a particular process. Storage controllers may move information to and from storage devices, and to and from the cache (including the NVS) by using TCBs to manage the movement of data. When a write request issues from a host computer to a storage controller, a TCB may be allocated from the operating system code. The TCB is used to maintain information about the write process from beginning to end as data to be written is passed from the host computer through the cache to the storage devices. If the cache is full, the TCB may be queued until existing data in the cache can be destaged (i.e., written to storage devices), in order to free up space. The destage operations may involve the moving of information from cache to storage such as a Redundant Array of Independent Disks (RAID) storage "rank" and destage TCBs may be allocated for performing the destage operations. A RAID storage "rank" is an array of storage devices configured in a RAID configuration to facilitate data recovery in the event a storage device of the RAID array fails.

TCBs may be classified on the basis of the task being controlled by the particular TCB. For example, a "background" TCB is a TCB that controls an operation which is not directly related to a host input/output operation. Thus, one example of a background TCB is a TCB which controls a destage operation as a background operation not required as part of a particular host I/O operations. Another example of a background TCB is a TCB which controls a prestage of tracks from storage to cache in which the prestage operation is being performed as a background operation not required as part of a particular host I/O operation. There is typically a limit imposed on the number of background TCBs that can be allocated for background operations directed to a storage rank at any given point of time depending on the type of storage rank. If a background TCB allocation operation attempts to exceed the limit imposed for a particular storage rank, the attempted allocation of the background TCB fails. In response to the failure, allocation of a background TCB may be retried.

Another type of TCB is a "foreground" TCB that controls an operation which is typically directly related to a host input/output operation. For example, a foreground TCB may be allocated to perform a destage or stage operation on behalf of a host I/O operation. Thus, a cache miss on a host read typically causes a stage operation controlled by a foreground TCB, to stage one or more tracks from storage to cache to satisfy the host read operation.

In a manner similar to that of background TCBs, there is typically a limit imposed on the number of foreground TCBs that can be allocated to a storage rank at any given point of time depending on the type of storage rank. However, if a foreground TCB allocation operation exceeds the limit imposed for a particular storage rank, the attempted allocation of the foreground TCB does not fail but instead, the foreground TCB allocation attempt is queued. When a foreground TCB is deallocated such as upon the completion of a foreground task, the foreground TCB allocation attempt at the head of the queue is allocated a new foreground TCB allocation.

A storage controller typically maintains a cache directory which identifies tracks having data stored in the cache as a result of a prestage or stage operation which transfers the data of a track stored in the storage to the cache, or as a result of a host write operation which writes data to the cache for subsequent destaging to the corresponding track or tracks of the storage. Such a cache directory is frequently implemented in the form a hash table of all tracks in cache. Each track is hashed into a slot of the cache directory which includes a track identification (ID) and an indication as to whether the data of the track is "dirty", that is, has not yet been safely destaged to the corresponding track of the storage. Multiple tracks hashed into a slot are linked together.

As previously mentioned, data may be destaged from cache in a background process such that at any one particular time, there may be dirty data stored in the cache which has not yet been safely destaged to the storage. Dirty data to be destaged from cache for a particular RAID rank may be identified by a background destage process traversing rank based b-trees. In the event of a power loss or device failure in the cache, data not yet successfully destaged to storage may be lost.

Accordingly, storage controllers frequently employ a safe data commit process which scans the cache directory for dirty data to be destaged to secondary storage. Such a scan of the cache directory may be initiated on a periodic basis, such as on the hour, for example. Storage controllers may note the time when a safe data commit scan is started. When the safe data commit process completes, the safe data commit scan start time may be displayed in a log. As a consequence, an operator may be assured that anything written to cache prior to the safe data commit scan start time has been successfully destaged and is safely stored on the storage. In the event of a data loss, only data that was written to cache after the safe data commit scan start time, may need to be restored. However, a storage controller may exhibit an increase in response time for host initiated I/O operations which are initiated during a safe data commit process.

In a known safe data commit process, TCBs are allocated to scan the cache directory. The storage controller may reserve a certain number of TCBs to be allocated for safe data commit process. For a storage controller having multiple central processing units (CPUs), the number of TCBs allocated for the cache directory scan may equal the number of CPUs of the storage controller.

The cache directory may be subdivided for the safe data commit process so that each CPU is assigned a portion of the cache directory to scan for dirty data. The tracks represented in each cache directory portion are a function of the particular host input/output operations and background operations which caused data to be staged or destaged. Thus, each portion of the cache directory being scanned may represent tracks from one or more RAID ranks. Conversely, each RAID rank may have tracks represented in one or more cache directory portions of the safe data commit process.

SUMMARY

One general aspect of distributed safe data commit processes in accordance with the present description includes distributed safe data commit logic which manages the allocation of task control data structures such as task control blocks (TCBs) for the safe data commit process as a function of the type of TCB to be allocated for destaging and as a function of the identity of the storage unit, such as a RAID storage rank, for example, to which the data is being destaged in a particular destage operation of the safe data commit process. In one aspect, the safe data commit logic destages data stored in a cache which has not yet been destaged to storage in a manner which can reduce the impact of safe data commit operations on response times of ongoing input/output operations of the host, cache and storage. Other aspects may be realized depending upon the particular application.

In one aspect of the present description, distributed safe data commit logic is configured to destage data stored in the cache which has not yet been destaged for storage to an associated subunit of storage, such as a track, for example, of a unit of storage, such as a RAID storage rank, for example, In one embodiment, the distributed safe data commit logic includes scan logic configured to identify a subunit of storage for which there is data stored in cache which has not yet been destaged for storage to the associated subunit of storage of a unit of storage. The distributed safe data commit logic further includes allocation logic configured to identify the unit of storage of the identified subunit of storage and to allocate a task control data structure of a first type (such as a background TCB, for example) to destage the data of the identified subunit of storage to the unit of storage if a total of the task control data structures of the first type allocated to the identified unit of storage of the identified subunit of storage remains within a limit imposed for a total of task control data structures of the first type allocated to the identified unit of storage. The allocation logic is further configured to allocate a task control data structure of a second type such as a foreground TCB, for example, to destage the data of the identified subunit of storage to the unit of storage if a total of the task control data structures of the first type allocated to the identified unit of storage of the identified subunit of storage has reached the limit imposed for a total of task control data structures of the first type allocated to the identified unit of storage.

In one embodiment, the unit of storage is a RAID array or rank of storage devices and the subunit of storage is a track of the RAID rank of storage devices. In another embodiment, the task control data structure of the first type is a background task control block (TCB) and where the task control data structure of the second type is a foreground task control block (TCB).

In another aspect, the distributed safe data commit logic further includes destage logic configured to destage data stored in the cache to the identified subunit of storage of the identified unit of storage using the allocated task control data structure. In addition, the allocation logic is further configured to deallocate the allocated task control data structure in association with completion of destaging data stored in the cache to the identified subunit of storage of the identified unit of storage using the allocated task control data structure.

In still another aspect, the allocation logic further includes a queue memory configured to store a queue of requests for allocation of task control data structures of the second type. In addition, the allocation logic is further configured to place requests for allocation of task control data structures of the second type in the queue memory to await execution if a total of the task control data structures of the second type allocated to the identified unit of storage of the identified subunit of storage has reached a limit imposed for a total of task control data structures of the second type allocated to the identified unit of storage.

In yet another aspect, a storage controller includes a plurality of processing units and the allocation logic is further configured to allocate a plurality of scan task control blocks for the plurality of processing units of the storage controller wherein a total of the allocated plurality of scan task control blocks is a function of a total number of processing units of the storage controller. The allocation logic is further configured to assign an allocated scan task control block to a processing unit of the storage controller to scan an assigned portion of a directory data structure for subunits of storage for which there is data stored in cache. In one embodiment, the scan logic is further configured to scan the assigned portion of the directory data structure for subunits of storage for which there is data stored in cache using the assigned allocated scan task control block.

Implementations of the described techniques may include hardware, a method or process, or computer software on a computer-accessible medium. Other features and aspects may be realized, depending upon the particular application.

DETAILED DESCRIPTION

Figure 1:
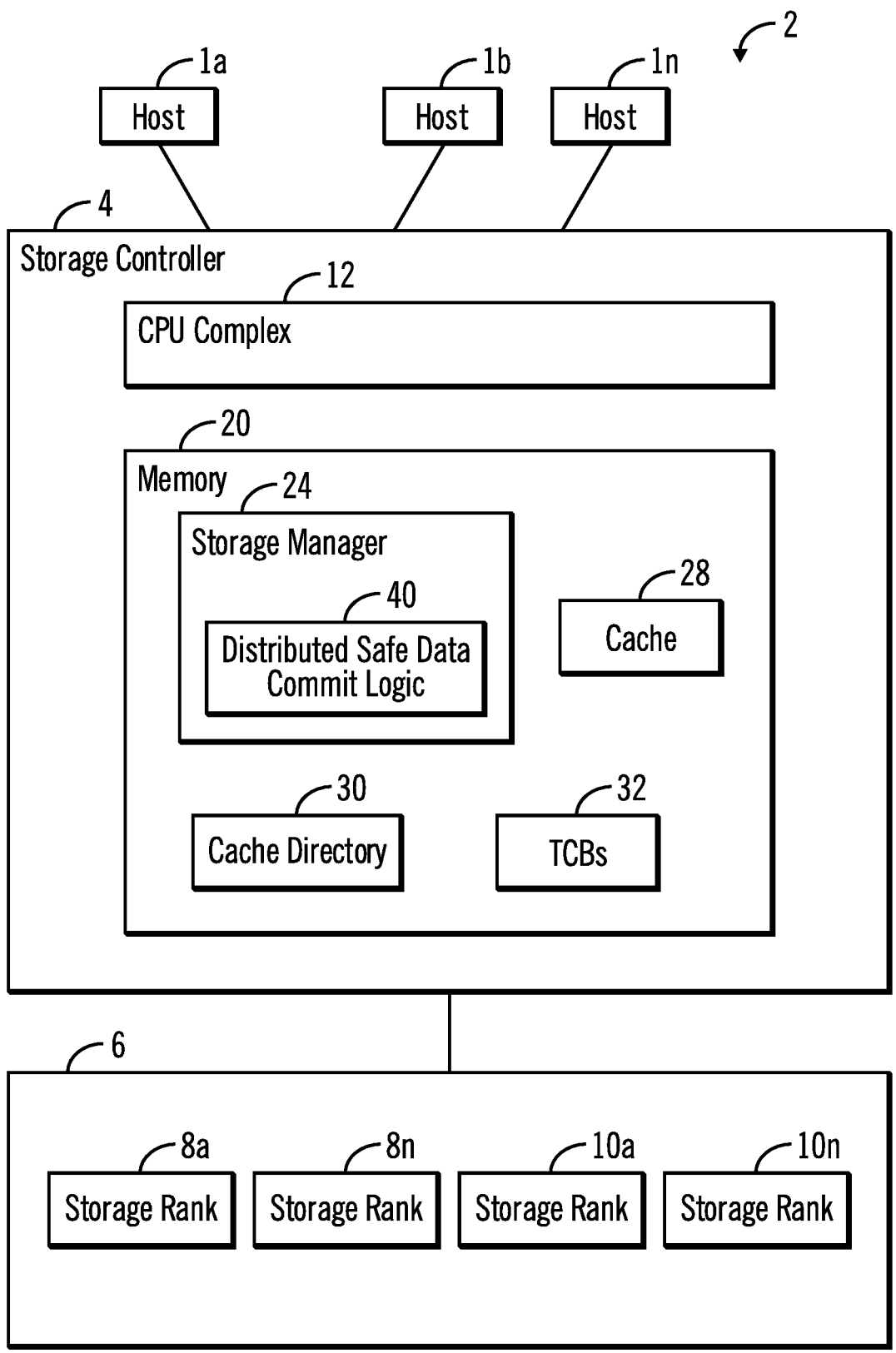
FIG. 1 illustrates an embodiment of a computing environment employing distributed safe data commit in a data storage system in accordance with one aspect of the present description.

As set forth above, a storage controller may exhibit an increase in response time for host initiated I/O operations which are initiated during prior safe data commit processes. In one aspect of the present description, distributed safe data commit logic is configured to destage data stored in a cache which has not yet been destaged to storage in a manner which can reduce the impact of safe data commit operations on response times of ongoing input/output operations of the host, cache and storage. In one aspect of the present description, distributed safe data commit logic manages the allocation of TCBs for the safe data commit process as a function of the type of TCB to be allocated for destaging and as a function of the identity of the RAID storage rank to which the data is being destaged in a particular destage operation of the safe data commit process.

For example, in one embodiment, allocation of TCBs may be limited based upon RAID storage rank to spread out the allocation of safe data commit process TCBs amongst the RAID storage ranks to reduce the impact of the safe data commit process upon any one particular RAID storage rank. In contrast, it is recognized herein that in a known prior safe data commit process, TCBs are not allocated by RAID storage rank but instead are allocated as a function of the locations of entries within the cache directory which indicate the presence of dirty data in the cache. As a result, the allocation of TCBs in the known prior safe data commit process may not be spread out amongst the RAID storage ranks but instead are spread out across the cache directory.

For example, in a known safe data commit process, the cache directory is subdivided for the safe data commit process so that each CPU is assigned a portion of the cache directory to scan for dirty data. The tracks represented in each cache directory portion are the result of particular host input/output operations and background operations which caused data to be staged or destaged. Thus, each portion of the cache directory being scanned may represent tracks from one or more RAID storage ranks. Conversely, each RAID storage rank may have tracks represented in one or more cache directory portions of the safe data commit process. As a result, the allocation of TCBs resulting from the scan of each cache directory portion in the known prior safe data commit process may not be spread out amongst the RAID storage ranks but instead are spread out across the cache directory by the subdivision of the cache directory for scanning without regard to limits for the RAID storage ranks.

In another aspect of the present description, distributed safe data commit logic prioritizes the allocation of background TCBs over the allocation of foreground TCBs for destage operations of the safe data commit process for a particular RAID storage rank. Using a background TCB allocated to a requesting destage process, the safe data commit destage operation to the particular RAID storage rank may be completed. Because host-initiated read operations, for example, typically use foreground TCBs rather than background TCBs, increasing the number of background TCBs being used for safe data commit destage operations and decreasing the number of foreground TCBs being used for safe data commit operations can reduce the impact of safe data commit operations on the response times of host-initiated read operations.

In another aspect of the present description, the number of background TCBs allocated to any one RAID storage rank is limited. For example, the number of background TCBs allocated may be limited by RAID storage rank type, the faster RAID storage rank types receiving a higher limit than slower RAID storage rank types, for example. By limiting the number of background TCBs being allocated for safe data commit destage operations directed to a particular RAID storage rank, the impact on other operations such as host-initiated I/O operations directed to the same RAID storage rank may be reduced.

In another aspect of the present description, once the limit of background TCBs for a particular RAID storage rank is reached, the distributed safe data commit logic switches to allocating foreground TCBs instead of background TCBs so long as the number of background TCBs allocated to that RAID storage rank remains at the limit. In a manner similar to that of background TCBs, the number of foreground TCBs allocated to any one RAID storage rank is limited by the distributed safe data commit logic. Again, the number of foreground TCBs allocated may be limited by RAID storage rank type, the faster RAID storage rank types receiving a higher limit than slower RAID storage rank types, for example. Once the limit of foreground TCBs for a particular RAID storage rank is reached, the request for allocation of a foreground TCB is placed in a queue. When a foreground TCB is deallocated making a new foreground TCB available for allocation, the foreground TCB request at the front of the queue is awarded an available foreground TCB to complete the foreground TCB allocation. Using the foreground TCB allocated to the requesting destage process, the safe data commit destage operation to the particular RAID storage rank may be completed.

It is appreciated that placing requests for allocation of foreground TCBs in a foreground TCB queue can reduce the number of foreground TCBs available for host-initiated operations and thus can cause read operations to slow down. However, because background TCBs are prioritized over foreground TCBs in distributed safe data commit allocations in one embodiment in accordance with the present description, allocation of foreground TCBs may be deferred until the limit for background TCBs has been reached. As a consequence, lower priority background operations may be slowed instead of higher priority host-initiated operations which utilize foreground TCBs. Thus, slowing of higher priority host-initiated operations may be reduced or eliminated, particularly during initial intervals in which the limits imposed upon background TCB allocation have not been reached. Still further, because limits on allocation of TCBs are imposed on a rank by rank basis, the impact of high rates of safe data commit destage operations directed to particular RAID storage ranks which previously caused spikes in host-initiated operation response times may be reduced. Still further, limiting the allocation of TCBs on a rank by rank basis can increase availability of TCBs for allocations for other RAID storage ranks having lower rates of operations. Other aspects and advantages may be realized, depending upon the particular application.

A system of one or more computers may be configured for distributed safe data commit in a data storage system in accordance with the present description, by virtue of having software, firmware, hardware, or a combination of them installed on the system that in operation causes or cause the system to perform distributed safe data commit operations in accordance with the present description. For example, one or more computer programs may be configured to perform distributed safe data commit in a data storage system by virtue of including instructions that, when executed by data processing apparatus, cause the apparatus to perform the actions.

The operations described herein are performed by logic which is configured to perform the operations either automatically or substantially automatically with little or no system operator intervention, except where indicated as being performed manually. Thus, as used herein, the term "automatic" includes both fully automatic, that is operations performed by one or more hardware or software controlled machines with no human intervention such as user inputs to a graphical user selection interface. As used herein, the term "automatic" further includes predominantly automatic, that is, most of the operations (such as greater than 50%, for example) are performed by one or more hardware or software controlled machines with no human intervention such as user inputs to a graphical user selection interface, and the remainder of the operations (less than 50%, for example) are performed manually, that is, the manual operations are performed by one or more hardware or software controlled machines with human intervention such as user inputs to a graphical user selection interface to direct the performance of the operations.

Many of the functional elements described in this specification have been labeled as "logic," in order to more particularly emphasize their implementation independence. For example, a logic element may be implemented as a hardware circuit comprising custom VLSI circuits or gate arrays, off-the-shelf semiconductors such as logic chips, transistors, or other discrete components. A logic element may also be implemented in programmable hardware devices such as field programmable gate arrays, programmable array logic, programmable logic devices or the like.

A logic element may also be implemented in software for execution by various types of processors. A logic element which includes executable code may, for instance, comprise one or more physical or logical blocks of computer instructions which may, for instance, be organized as an object, procedure, or function. Nevertheless, the executables of an identified logic element need not be physically located together, but may comprise disparate instructions stored in different locations which, when joined logically together, comprise the logic element and achieve the stated purpose for the logic element.

Indeed, executable code for a logic element may be a single instruction, or many instructions, and may even be distributed over several different code segments, among different programs, among different processors, and across several memory devices. Similarly, operational data may be identified and illustrated herein within logic elements, and may be embodied in any suitable form and organized within any suitable type of data structure. The operational data may be collected as a single data set, or may be distributed over different locations including over different storage devices.

Implementations of the described techniques may include hardware, a method or process, or computer software on a computer-accessible medium. FIG. 1 illustrates an embodiment of a computing environment employing distributed safe data commit in a data storage system in accordance with the present description. A plurality of hosts $1a$, $1b$ . . . $1n$ may submit Input/Output (I/O) requests over a network to one or more data storage devices 2 to read or write data. The hosts $1a$, $1b$ . . . $1n$ may be separate physical devices or may be virtual devices implemented using assigned resources of partitions of a server, for example. In a similar manner, the data storage device or devices 2 may be separate physical devices or may be virtual devices implemented using assigned resources of partitions one or more servers, for example.

Each data storage device 2 includes a storage controller or control unit 4 which accesses data stored in a plurality of data storage units of storage 6. Each data storage unit of the storage 6 may comprise any suitable device capable of storing data, such as physical hard disks, solid state drives, etc., known in the art. Thus, in one embodiment, the storage 6 may be comprised of one or more sequential access storage devices, such as hard disk drives and magnetic tape or may include non-sequential access storage devices such as solid state drives (SSD), for example. Each device of storage 6 may comprise a single sequential or non-sequential access device for data storage or may comprise an array of devices for data storage, such as a Just a Bunch of Disks (JBOD), Direct Access Storage Device (DASD), Redundant Array of Independent Disks (RAID) array, virtualization device, tape storage, flash memory, etc.

In certain embodiments, for example, storage units may be disks that are configured as a first type of Redundant Array of Independent Disk (RAID) storage ranks $8a$, . . . $8n$, in which each RAID storage rank is an array of hard disks in a RAID configuration to facilitate data recovery in the event of loss of a hard disk. The storage units of the storage 6 may also include RAID storage ranks $10a$, . . . $10n$ of a second type in which each RAID storage rank is an array of storage of another type such as solid state drives in a RAID configuration to facilitate data recovery in the event of loss of a solid state drive. The storage units of the storage 6 may be configured to store data in subunits of data storage such as volumes, tracks, etc.

Each storage controller 4 includes a CPU complex 12 including processor resources provided by one or more processors or central processing units, each having a single or multiple processor cores. In this embodiment, a processor core contains the components of a CPU involved in executing instructions, such as an arithmetic logic unit (ALU), floating point unit (FPU), and/or various levels of cache (such as L1 and L2 cache), for example. It is appreciated that a processor core may have other logic elements in addition to or instead of those mentioned herein.

Each storage controller 4 further has a memory 20 that includes a storage manager 24 for managing storage operations including writing data to or reading data from an associated storage 6 in response to an I/O data request from a host. A cache 28 of the memory 20 may comprise one or more of different types of memory, such as RAMs, write caches, read caches, NVS, etc. The different types of memory that comprise the cache may interoperate with each other. Writes from the hosts 1*a* . . . 1*n* may initially be written to the cache 28 and then later destaged to the storage 6. Read requests from the hosts 1*a* . . . 1*n* may be satisfied from the cache 28 if the corresponding information is available in the cache 28, otherwise the information is staged from the storage 6 to the cache 28 and then provided to the requesting host 1*a* . . . 1*n*.

The memory 20 of the storage controller 4 includes a cache directory 30 which identifies tracks having data stored in the cache 28 as a result of a prestage or stage operation which transfers the data of a track stored in the storage 6 to the cache 28, or as a result of a host write operation which writes data to the cache 28 for subsequent destaging to the corresponding track or tracks of the storage 6. In the illustrated embodiment, and as explained in greater detail below in connection with FIG. 6, the cache directory 30 is implemented in the form of a known data structure which is a hash table of all tracks in cache 28. Each track is hashed into a slot of the cache directory 30 which includes a track identification (ID) and an indication as to whether the data of the track is "dirty", that is, has not yet been safely destaged to the corresponding track of the storage 6. Multiple tracks hashed into a slot are linked together. It is appreciated that a suitable cache directory may be implemented using other types of data structures.

Operations including I/O operations of the storage manager 24, including stage, prestage and destage operations, for example, utilize Task Control Blocks (TCBs) 32 of the memory 20. Each TCB is a data structure in the operating system kernel containing the information needed to manage a particular process. Storage controllers may move information to and from storage, and to and from the cache by using TCBs to manage the movement of data. When a write request issues from a host to a storage controller, a TCB may be allocated from the operating system code. The TCB is used to maintain information about the write process from beginning to end as data to be written is passed from the host through the cache to the storage. If the cache is full, the TCB may be queued until existing data in the cache can be destaged (i.e., written to storage), in order to free up space.

As previously noted, TCBs may be classified on the basis of the task being controlled by the particular TCB. For example, a "background" TCB is a TCB that controls an operation which is not directly related to a host input/output operation. Another type of TCB is a "foreground" TCB that controls an operation which is directly related to a host input/output operation.

The storage manager 24 further includes distributed safe data commit logic 40 which periodically scans the cache directory 30 for dirty data to be destaged to storage 6. The safe data commit process permits an operator to be assured that anything written to cache 28 prior to the safe data commit scan start time has been successfully destaged and safely stored on the storage 6.

It is recognized herein that prior safe data commit processes may cause a significant increase in response time for host initiated I/O operations which are initiated during a safe data commit process. As explained in greater detail below, the distributed safe data commit logic 40 manages the allocation of TCBs during the safe data commit process in a manner which can reduce or eliminate substantial impact by the safe data commit process upon host initiated I/O operations.

In the illustrated embodiment, the storage manager 24 including the distributed safe data commit logic 40, is depicted as software stored in the memory 20 and executed by the CPU complex 12. However, it is appreciated that the logic functions of the storage manager 24 may be implemented as hardware, software, firmware or combinations of one or more thereof, depending upon the particular application.

The storage manager 24 (FIG. 1) in one embodiment may store data in the cache 28 and transfer data between the cache 28 and storage 6 in tracks. As used herein, the term track may refer to a subunit of data or storage of a disk storage unit, a solid state storage unit or other types of storage units. In addition to tracks, storage units may have other subunits of storage or data such as a bit, byte, word, segment, page, block (such as a Logical Block Address (LBA)), cylinder, segment, extent, volume, logical device, etc. or any portion thereof, or other subunits suitable for transfer or storage. Accordingly, the size of subunits of data processed in safe data commit processes in accordance with the present description may vary, depending upon the particular application. Thus, as used herein, the term "track" refers to any suitable subunit of data storage or transfer.

The system components 1*a*, 1*b* . . . 1*n*, 4, 6 are connected to a network which enables communication among these components. Thus, the network includes a fabric which may comprise a Storage Area Network (SAN), Local Area Network (LAN), Intranet, the Internet, Wide Area Network (WAN), peer-to-peer network, wireless network, arbitrated loop network, etc. Communication paths from the storage subsystems to the hosts 1*a*, 1*b*, . . . 1*n* may be based upon a particular host attachment protocol such as Fibre Connection (FICON), for example. Other communication paths of the fabric may comprise for example, a Fibre Channel arbitrated loop configuration, a serial loop architecture or a bus interface, such as a Peripheral Component Interconnect (PCI) interface such as a PCI-Express interface. The communication paths of the fabric may also be part of an Ethernet network, for example, such that each node has an individual network (internet protocol) address. Other types of communication paths may be utilized, such as a modem telephone path, wireless network, etc., depending upon the particular application.

Communication software associated with the communication paths includes instructions and other software controlling communication protocols and the operation of the communication hardware in accordance with the communication protocols, if any. It is appreciated that other communication path protocols may be utilized, depending upon the particular application.

Figure 2:
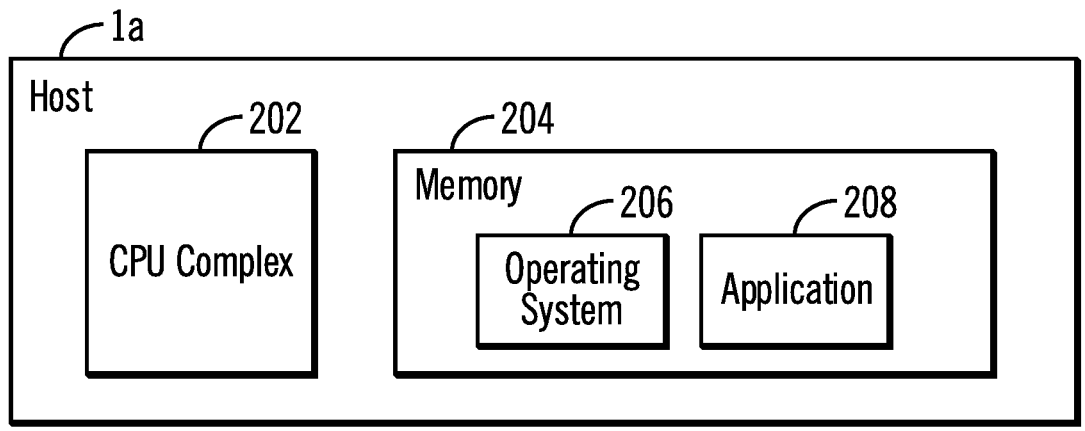
FIG. 2 illustrates an example of a host in the computing environment of FIG. 1.

A typical host as represented by the host 1*a* of FIG. 2 includes a CPU complex 202 and a memory 204 having an operating system 206 and an application 208 that cooperate to read data from and write data updates to the storage 6 via a storage controller 4. An example of a suitable operating system is the z/OS operating system. It is appreciated that other types of operating systems may be employed, depending upon the particular application.

Figure 3:
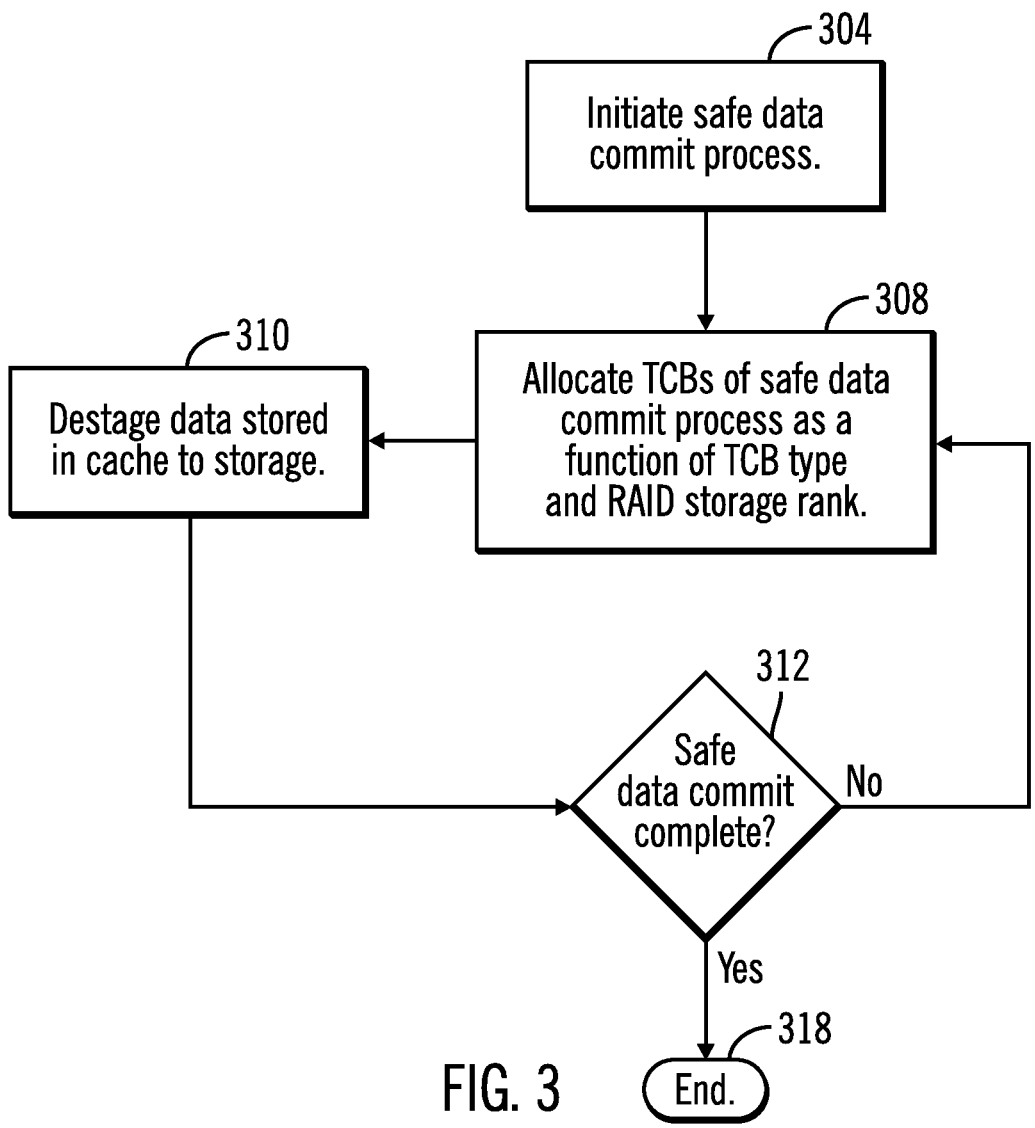
FIG. 3 illustrates an example of distributed safe data commit operations in accordance with one aspect of the present description.

FIG. 3 depicts one example of operations of a distributed safe data commit process in accordance with one aspect of the present description. In this example, upon initiating (block 304) a safe data commit process, safe data commit logic such as the logic 40 (FIG. 1) allocates (block 308) TCBs for the safe data commit process as a function of TCB type and RAID storage rank. In one embodiment, background TCBs are prioritized over foreground TCBs to reduce impact on host-initiated I/O operations. In addition, the number of foreground and background TCBs allocated to each RAID storage rank is limited to reduce impact on I/O operations directed to particular RAID storage ranks. Using TCBs allocated in this manner, data which has not yet been destaged to storage is destaged (block 310) from cache to storage. If is determined (block 312) that the safe data commit process has not yet been completed, TCBs continue to be allocated (block 308) until the process is complete (block 318). As explained in greater detail below, allocation of TCBs for safe data commit processes in this manner can reduce the impact of such safe data commit processes upon host-initiated I/O operations, reducing or eliminating increases in response times caused by the safe data commit processes.

Figure 4:
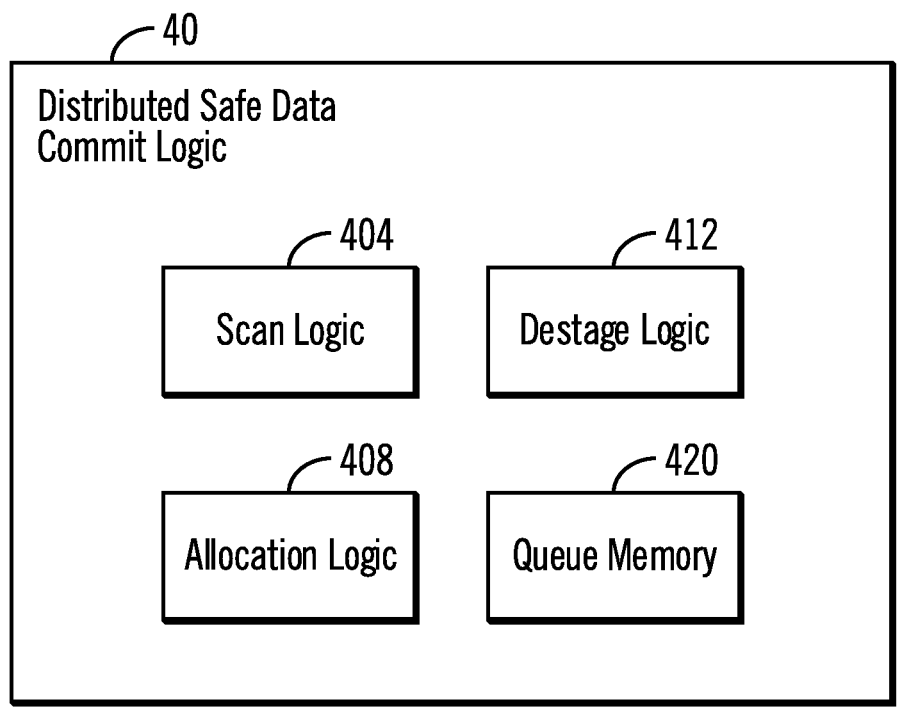
FIG. 4 illustrates an example of distributed safe data commit logic in accordance with one aspect of the present description.

FIG. 4 depicts one embodiment of the distributed safe data commit logic 40 of a data storage device 2 (FIG. 1) in greater detail. In this embodiment, the distributed safe data commit logic 40 (FIG. 3) is configured to destage data stored in the cache 28 (FIG. 1) which has not yet been destaged for storage to an associated subunit of storage of a unit of storage, in a manner which can reduce the impact of safe data commit operations on response time of ongoing input/output operations of the host and cache. In one aspect of the present description, the distributed safe data commit logic 40 manages the allocation of TCBs for the safe data scan process as a function of both the type of TCB to be allocated for destaging and as a function of the identity of the RAID storage rank to which the data is being destaged in a particular destage operation of the safe data commit process. As previously mentioned, in one embodiment, background TCBs are prioritized over foreground TCBs and the number of background and foreground TCBs allocated to each RAID storage rank is limited to reduce impact on other I/O operations directed to RAID storage ranks.

The distributed safe data commit logic 40 (FIG. 4) includes scan logic 404 configured to identify a subunit of storage such as a track, for example, for which there is data stored in cache 28 (FIG. 1) which has not yet been destaged for storage to the associated track or other subunit of storage of a unit of storage such as a RAID storage rank, for example. As explained in greater detail below, the distributed safe data commit logic 40 (FIG. 4) further includes allocation logic 408, destage logic 412 and a foreground TCB queue memory 420.

Figure 5:
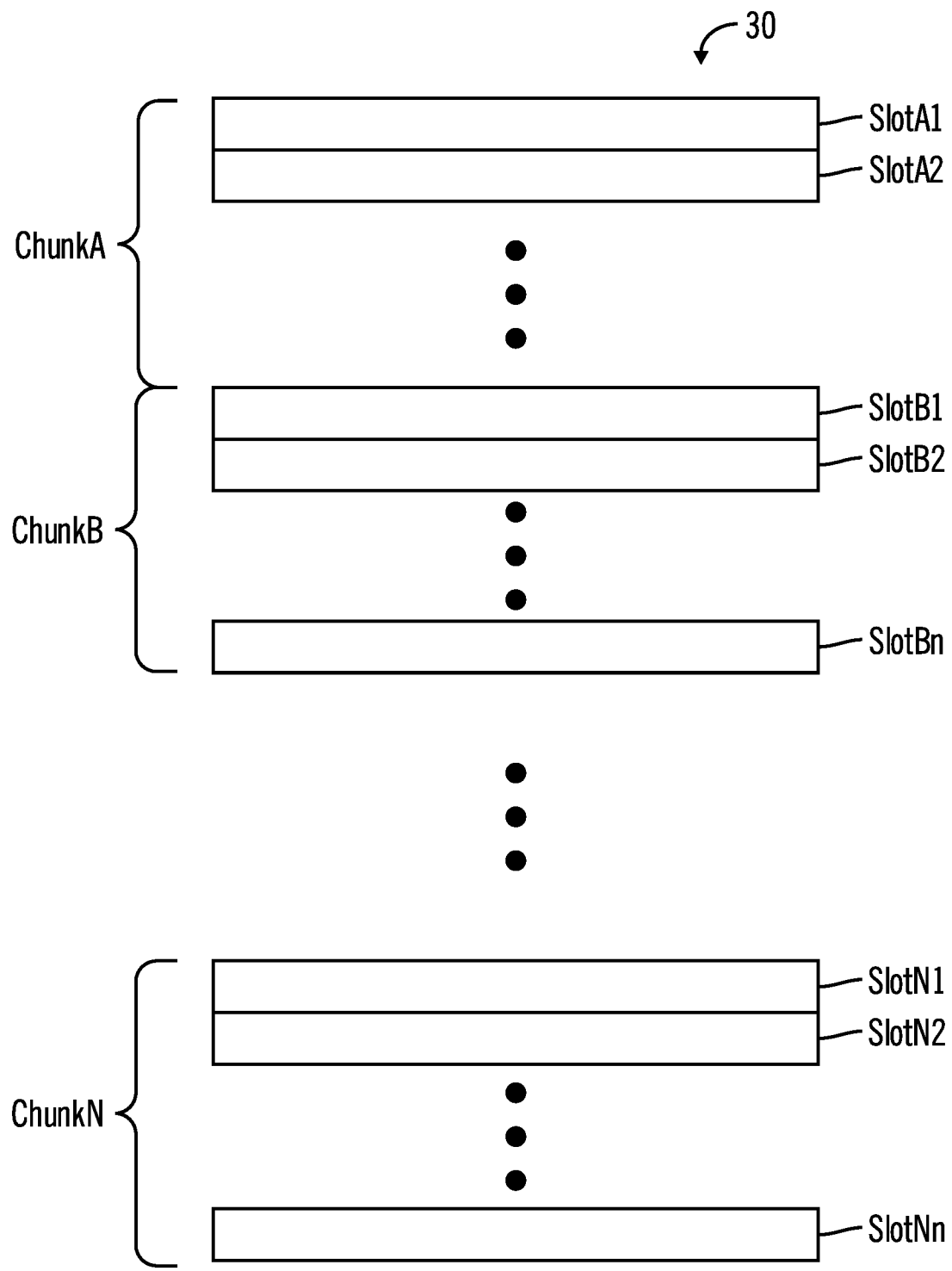
FIG. 5 depicts an example of a known cache directory which has been subdivided for distributed safe data commit operations in accordance with one aspect of the present description.

In the illustrated embodiment, the scan logic 404 is configured to scan a cache directory which identifies tracks having data stored in the cache as a result of a prestage or stage operation which transfers the data of a track stored in the storage to the cache, or as a result of a host write operation which writes data to the cache for subsequent destaging to the corresponding track or tracks of the storage. FIG. 5 depicts an example of a suitable known cache directory 30 which is implemented in the form a hash table of all tracks in the cache 28 (FIG. 1). Each track is hashed into an entry or slot of the cache directory.

Figure 6:
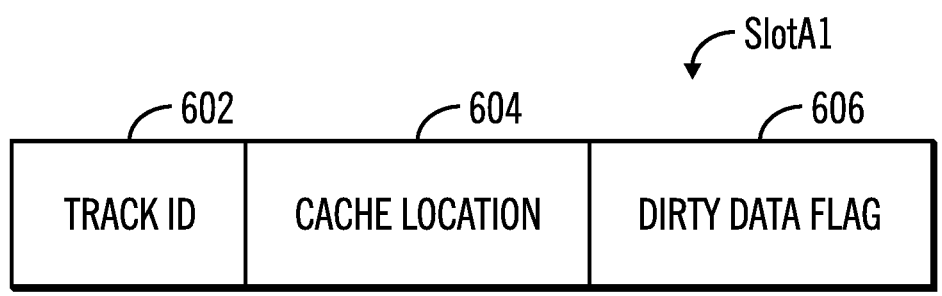
FIG. 6 depicts an example of a known entry of the cache directory of FIG. 5.

FIG. 6 depicts in greater detail an example of a known hash table entry, designated SlotA1 (FIGS. 5, 6), in this example, of the cache directory 30 (FIG. 5). In this embodiment, each slot or entry of the cache directory 30, as represented by the entry SlotA1 in FIGS. 5, 6, has a plurality of fields including a Track ID field 602 (FIG. 6) which identifies for a track or extent of tracks having data stored in the cache 28 and hashed in that particular entry, the location or locations of the track or tracks within the storage 6 (FIG. 1). In one embodiment, the Track ID field 602 (FIG. 6) identifies in addition to other storage location information, the particular RAID storage rank 8a ... 8n or 10a ... 10n (FIG. 1) storing the track or tracks of a cache directory entry such as the entry SlotA1 of the cache directory 30. The other storage location information identified by the Track ID field 602 for the track or tracks hashed by the particular slot or entry of the cache directory may include a device identification, a logical block address, a track number and other location address or identification information for the track or tracks to which the cache directory entry is directed.

As shown in FIG. 6, each slot or entry of the cache directory 30 further includes a "Cache Location" field 604 which identifies the location or locations within the cache 28 in which the data of the track or tracks to which the cache directory entry is directed, are stored. In addition, a "Dirty Data Flag" field 606, indicates whether the data stored in the cache for the track or tracks to which the cache directory entry pertains has been modified by a write operation as compared to original data which may be currently stored in the storage location or locations identified by the Track ID field of the cache directory entry. As previously mentioned "dirty" data is data stored in the cache that has not yet been safely destaged to the corresponding track of the storage. Multiple tracks hashed into a single slot or entry may be linked together by one or both of the Track ID field 602 and the Cache Location field 604.

Figure 7:
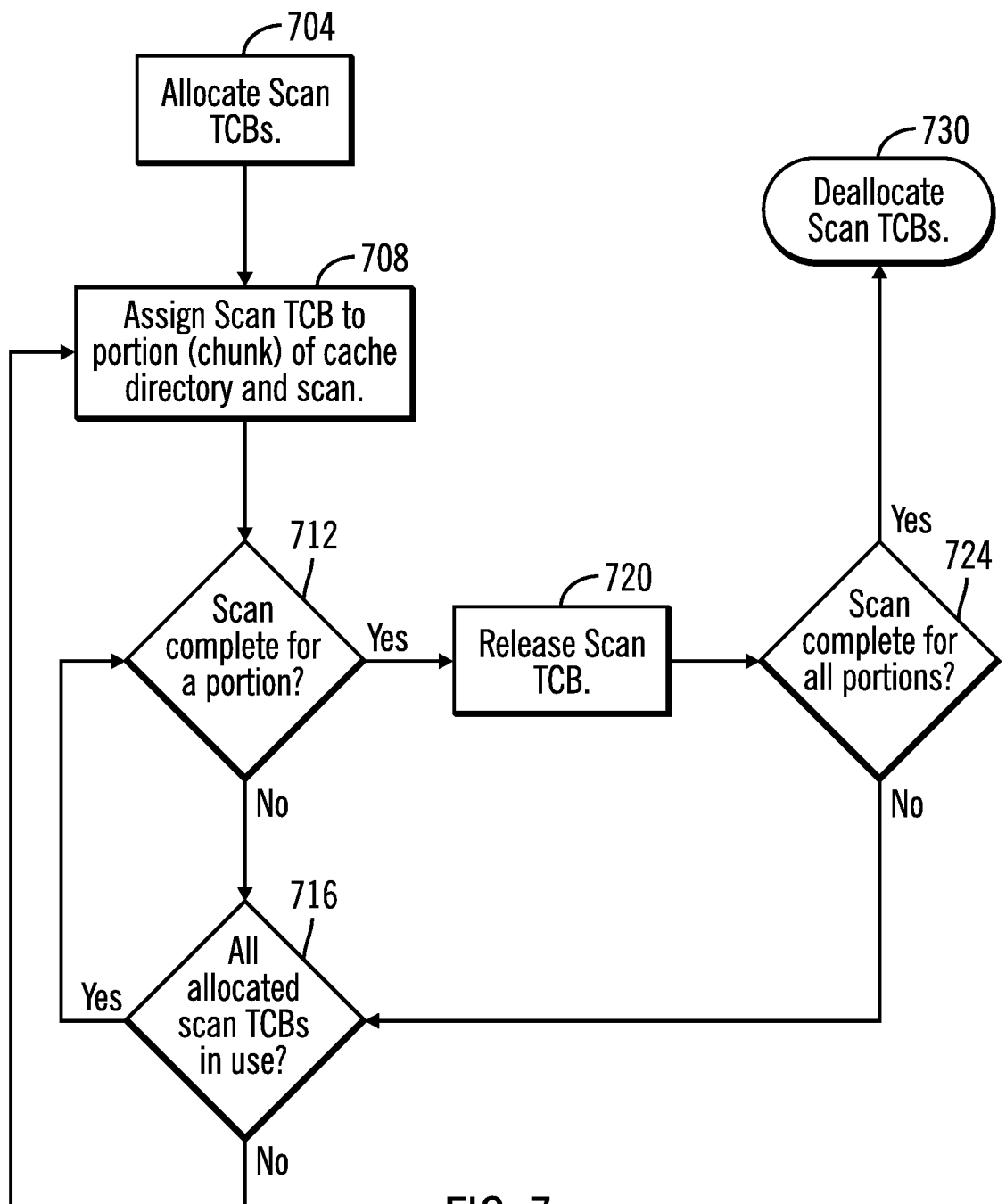
FIG. 7 illustrates an example of cache directory scan operations of distributed safe data commit operations in accordance with one aspect of the present description.

The scan logic 404 (FIG. 4) is configured to scan the cache directory 30 (FIG. 5) to identify a subunit of storage such as a track or tracks, for example, for which there is data stored in cache 28 (FIG. 1) which has not yet been destaged for storage in the associated track, tracks or other subunit of storage of a unit of storage such as a RAID storage rank, for example. FIG. 7 depicts in greater detail, one example of a cache directory scan operation of a safe data commit operation by the scan logic 404 together with the allocation logic 408 of the distributed safe data commit logic 40 (FIG. 4). The allocation logic 408 is configured to allocate (block 704, FIG. 7) a plurality of scan task control blocks for the plurality of processing units of the storage controller 4. As previously mentioned, in this embodiment, the CPU complex 12 (FIG. 1) of the storage controller 4 may have a plurality of processors or central processing units, each having a single or multiple processor cores. In this embodiment, the total number of scan task control blocks allocated (block 704) by the allocation logic 408 is a function of the total number of processing units of the storage controller 4. For example, if the CPU complex 12 has N processing units, the allocation logic 408 may allocate N scan TCBs for the cache directory scan of the safe data commit process. Thus, in one embodiment, the same number N of scan TCBs may be allocated as the number N of processing units of the CPU complex 12. It is appreciated that the number scan TCBs which are allocated may differ from the number of processing units of the CPU complex 12, depending upon the particular application.

In this embodiment, the cache directory 30 (FIG. 5) may be subdivided for the cache directory scan operation into portions or "chunks" as a function of the total number of processing units of the storage controller 4. For example, if the CPU complex 12 has N processing units, the allocation logic 408 may subdivide the cache directory 30 for the cache directory scan of the safe data commit process, into N chunks or portions, the same number N as the number of processing units of the CPU complex 12. In the example of FIG. 5, the cache directory 30 has been subdivided into N chunks or portions represented by chunks ChunkA, ChunkB . . . ChunkN. The portion ChunkA has a plurality of slots or entries SlotA1, SlotA2 . . . SlotAn, the portion ChunkB has a plurality of slots or entries SlotB1, SlotB2 . . . SlotBn, etc. with the portion ChunkN having a plurality of slots or entries SlotN1, SlotN2 . . . SlotNn as shown in FIG. 5. In one embodiment, the number of slots or entries in each chunk of the cache directory 30 may be substantially equal or may vary from chunk to chunk, depending upon the particular application.

Having allocated (block 704, FIG. 7) the scan TCBs for the cache directory scan and having subdivided the cache directory 30 (FIG. 5) into chunks, the allocation logic 408 (FIG. 4) may assign (block 708, FIG. 7) an allocated scan task control block to a processing unit of the storage system to scan an assigned portion or chunk of the cache directory 30. In this manner, the entire cache directory 30 may be scanned by the N processing units in parallel, each processing unit scanning an assigned chunk or portion of the cache directory in parallel with the other processing units.

As explained in greater detail in connection with FIG. 8, the scan logic 404 (FIG. 4) is configured to cause each processing unit to scan an assigned portion or chunk of the cache directory for tracks or other subunits of storage for which there is data stored in cache, using the assigned allocated scan task control block. The allocation logic 408 (FIG. 4) is configured to determine (block 712, FIG. 7) whether such a scan operation of a cache directory portion is complete. If not, the allocation logic 408 (FIG. 4) is further configured to determine (block 716, FIG. 7) whether all the scan TCBs which were allocated (block 704) are in use. If not, another allocated scan TCB may be assigned (block 708, FIG. 7) to a processing unit of the storage system to scan an assigned portion or chunk of the cache directory 30. If all allocated scan TCBs are determined (block 716) to be in use, the entire cache directory 30 may be scanned by the N processing units in parallel, each processing unit scanning an assigned chunk or portion of the cache directory in parallel with the other processing units.

If it is determined (block 712) that the scanning of a chunk or portion of the cache directory 30 has been completed, that scan TCB may be released (block 720) by the allocation logic 408. The allocation logic 408 (FIG. 4) is further configured to determine (block 724, FIG. 7) whether all scan operations of the cache directory have been completed such that all cache directory chunks or portions have been scanned. If not, the allocation logic 408 (FIG. 4) is further configured to determine (block 716, FIG. 7) whether all the scan TCBs which were allocated (block 704) are in use and assigning (block 708) unused allocated scan TCBs. Once it is determined (block 724) that the scan of the cache directory is complete. the scan TCBs may be deallocated by the allocation logic 408.

Figure 8:
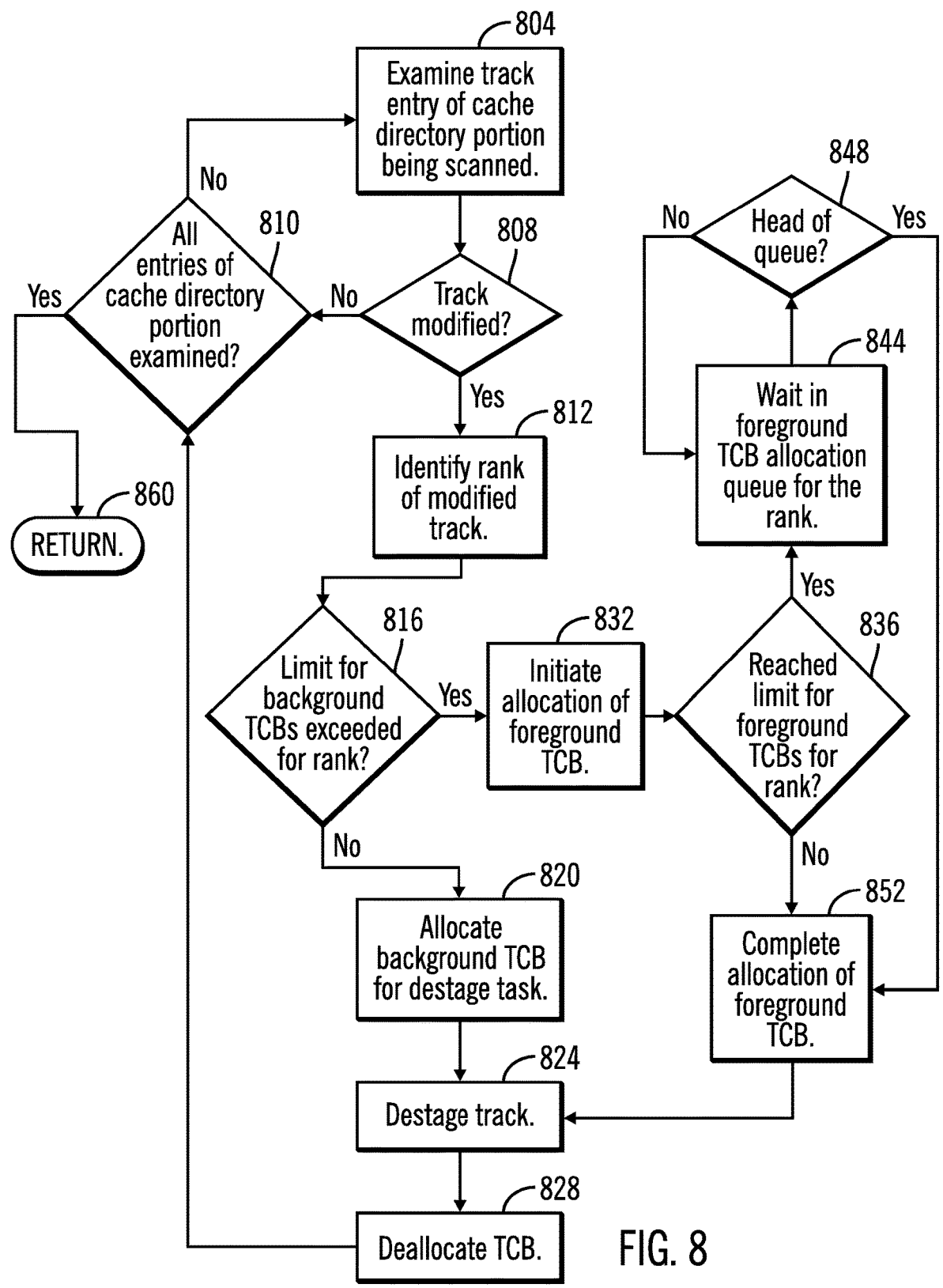
FIG. 8 illustrates an example of task control block allocation operations of distributed safe data commit operations in accordance with one aspect of the present description.

FIG. 8 depicts in greater detail one example of operations by the scan logic 404 (FIG. 4), the allocation logic 408 and the destage logic 412 of the distributed safe data commit logic 40 in the scanning of an assigned portion or chunk of the cache directory 30 (FIG. 5), allocating TCBs and destaging modified data of tracks or other subunits to storage, in a safe data commit process in accordance with the present description. In one operation, the scan logic 404 is configured to examine (block 804, FIG. 8) a slot or other entry of the cache directory portion being scanned. Thus, a central processing unit using an assigned scan TCB, may examine the entry SlotA1 (FIG. 5), for example, of the cache directory portion ChunkA, for example, which has been assigned to that central processing unit. One or more other central processing units may concurrently examine slots of other assigned chunks of the cache directory 30 in parallel with the scanning, allocation and destaging operations depicted in the example of FIG. 8 for the cache directory chunk ChunkA.

The scan logic 404 in examining a slot of the assigned chunk of the cache directory, is further configured to identify (block 808, FIG. 8) a track or other subunit of storage for which there is modified data stored in cache 28 which has not yet been destaged for storage. Thus, a central processing unit using an assigned scan TCB, may determine (block 808) if the entry SlotA1 being examined within the cache directory portion ChunkA indicates whether the data of the associated track as identified by the Track ID field 602 (FIG. 6) has been modified as indicated by the dirty data flag field 606 of the entry SlotA1 being examined. If it is determined (block 808, FIG. 8) that the entry being examined does not indicate that the associated track stored in cache 28 contains dirty data, the scan logic 404 examines (block 804, FIG. 8) the next entry of the cache directory 30 in sequence. In one embodiment, the entries of the particular chunk of the cache directory 30 may be examined in a sequential order defined by the Track ID fields 602 (FIG. 6) or by the cache location fields 604 or other suitable fields of the entries of the cache directory 30. It is appreciated that the particular sequential order of examining entries of the cache directory may vary, depending upon the particular application.

Examining (block 804, FIG. 8) of the entries of the cache directory chunks continue until (block 810) all entries of the cache directory chunk have been examined or until a cache directory entry indicating modified data is identified (block 808, FIG. 8). Upon identifying (block 808, FIG. 8) a track or other subunit of storage for which there is modified data stored in cache 28 which has not yet been destaged to storage, the allocation logic 408 (FIG. 4) is configured to identify (block 812, FIG. 8) the particular RAID storage rank or other storage unit storing the track having modified data in the cache 28. As previously mentioned, the particular RAID storage rank or storage unit for the track having modified data may be identified by the Track ID field 602 of the entry such as the entry SlotA1 of FIG. 6, for example. In this example, the track identified as having modified data as indicated by the dirty data flag field 606, may be found in the RAID storage rank 8a (FIG. 1), for example of the RAID storage ranks 8a . . . 8n, 10a . . . 10n of the storage 6 of FIG. 1. Thus, the Track ID field 602 identifies the RAID storage rank 8a as the particular storage unit containing the track identified as having modified data stored in the cache 28. In the embodiment of FIG. 8, the term "unit of storage" as used herein refers to a RAID storage rank or RAID storage array of storage devices and the term "subunit of storage" refers to a track of the RAID rank of storage devices. It is appreciated that safe data commit operations in accordance with the present description may be performed in connection with other types of storage units and other types of storage subunits.

Having identified (block 812, FIG. 8) the particular RAID storage rank or other storage unit for the track identified as having modified data, the allocation logic 408 (FIG. 4) is further configured to allocate a task control data structure of a first type such as a background TCB, for example, to destage the data of the identified track to the identified RAID storage rank or other identified storage unit, if the total number of the control data structures of the first type (e.g. background TCBs) allocated to the identified unit of storage (e.g. identified RAID storage rank) of the identified subunit of storage (e.g. identified track) remains within a limit imposed for the total number of control data structures of the first type (e.g. background TCBs) allocated to the identified unit of storage (e.g. identified RAID storage rank). As previously mentioned, a "background" TCB is a TCB that controls an operation which is not directly related to a host input/output operation. Thus. one example of a background TCB in accordance with the present disclosure, is a TCB which controls a destage operation as a background operation or as a safe data commit destage operation not required as part of a particular host I/O operations.

In the embodiment of FIG. 8 in which a unit of storage is a RAID storage rank and a subunit of storage is a track of a RAID storage rank, the allocation logic 408 is configured to determine (block 816, FIG. 8) whether the safe data commit limit for background TCBs which has been allocated for the identified RAID storage rank, would be exceeded by the allocation of an additional background TCB directed to that particular RAID storage rank of the track identified as having modified data stored in the cache. If not, an additional background TCB is allocated (block 820) by the allocation logic 408 for the destage task of the safe data commit process. The destage logic 412 (FIG. 4) is configured to destage (block 824, FIG. 8) using the allocated background or other allocated TCB, the modified data of the identified track from the cache location of the cache 28 as identified by the cache location field 604 (FIG. 6) of the cache directory entry being examined, to the appropriate track of the identified RAID storage rank as identified by the Track ID field 602 (FIG. 6) of the cache directory entry being examined. Upon completion of the destaging operation, the allocation logic 408 is further configured to deallocate (block 828, FIG. 8) the background TCB allocated for the destage operation, for use by another background or safe data commit operation. Also, once a background TCB is deallocated by the safe data commit process, it no longer counts against the safe data commit limit of background TCBs imposed upon a particular RAID storage rank during the safe data commit process.

Alternatively, if it is determined (block 816, FIG. 8) that the safe data commit limit for background TCBs which has been allocated for tasks directed to the identified RAID storage rank, would be exceeded by the allocation of an additional background TCB directed to that particular RAID storage rank of the track identified as having modified data stored in the cache, the allocation logic 408 is further configured to allocate a task control data structure of a second type (e.g. a foreground TCB) to destage the data of the identified subunit (e.g. track) of storage to the identified unit of storage (e.g. identified RAID storage rank). As previously mentioned, a "foreground" TCB is typically a TCB that controls an operation which is directly related to a host input/output operation. For example, a foreground TCB may be allocated to perform a destage or stage operation on behalf of host I/O operation. In one aspect of the present description, a foreground TCB may also be allocated for a destage operation of the safe data commit process if the limit on background TCBs for a particular RAID storage rank has been reached. Thus, in the embodiment of FIG. 8, if it is determined (block 816, FIG. 8) that the safe data commit limit for background TCBs which have been allocated for the identified RAID storage rank, would be exceeded by the allocation of an additional background TCB directed to that particular RAID storage rank, the allocation logic 408 is configured to initiate (block 832. FIG. 8) allocation of a foreground TCB by requesting allocation of a foreground TCB for the particular RAID storage rank.

In one aspect of the present description, the allocation logic 408 is further configured to impose a limit on the allocation of foreground TCBs for each RAID storage rank or other storage unit, in connection with the safe data commit process. Thus, the allocation logic 408 determines (block 836, FIG. 8) whether a predetermined limit on the allocation of foreground TCBs has been reached for the RAID storage rank identified by the track entry of the cache directory being examined. If the allocation logic 408 does determine (block 836, FIG. 8) that the limit on the allocation of foreground TCBs has been reached for the particular RAID storage rank of the cache directory entry being examined, the allocation logic 408 is further configured to place the request (block 832) for allocation of the foreground task control block in a foreground allocation request queue maintained for that particular RAID storage rank in the queue memory 420 (FIG. 4) wherein the request waits (block 844) until the foreground allocation request reaches the head of the foreground allocation request queue maintained by the allocation logic 408 for the particular RAID storage rank.

Upon completion of a destaging operation (block 824) using a foreground TCB, the allocation logic 408 is further configured to deallocate (block 828, FIG. 8) the foreground TCB allocated for the destage operation, for use by another I/O operation or safe data commit operation. Also, once a foreground TCB is deallocated by the safe data commit process, it no longer counts against the safe data commit limit of foreground TCBs imposed upon a particular RAID storage rank during the safe data commit process.

The allocation logic 408 is further configured to advance each foreground allocation request a position within the foreground allocation request queue for a particular RAID storage rank each time the allocation logic 408 deallocates (block 828, FIG. 8) a foreground TCB allocated for a completed destage operation directed to the identified RAID storage rank, and completes (block 852 FIG. 8) the allocation of a requested foreground TCB allocation which has reached the head of the queue for the identified RAID storage rank. Accordingly, once it is determined (block 848, FIG. 8) that a foreground allocation request has reached the head of the foreground allocation request queue maintained for the particular RAID storage rank, the allocation logic 408 completes (block 852, FIG. 8) the allocation of the requested foreground TCB at the head of the queue for the destage task of the safe data commit process directed to the particular RAID storage rank. In this manner, the requested foreground TCB awaits allocation and execution until the request reaches the head of the queue.

The destage logic 412 (FIG. 4) is configured to destage (block 824, FIG. 8) using the allocated foreground TCB, the modified data of the identified track from the cache location of the cache 28 as identified by the cache location field 604 (FIG. 6) of the cache directory entry being examined to the appropriate track of the identified RAID storage rank as identified by the Track ID field 602 (FIG. 6) of the cache directory entry being examined. Upon completion of the destaging operation, the allocation logic 408 is further configured to deallocate (block 828, FIG. 8) the foreground TCB allocated for the destage operation, for use by another I/O operation or a safe data commit operation as described above. Upon deallocation (block 828, FIG. 8) a foreground TCB allocated for a destage operation directed to a particular RAID storage rank, the allocation logic 408 advances each foreground allocation request a position within the foreground allocation request queue for that particular RAID storage rank.

However, in the event that the allocation logic 408 determines (block 836, FIG. 8) that the limit on the allocation of foreground TCBs has not been reached for the particular RAID storage rank of the cache directory entry being examined, the allocation logic 408 proceeds directly to complete (block 852, FIG. 8) the allocation of the requested foreground TCB allocation, and the destage logic 412 destages (block 824, FIG. 8) the modified data of the identified track as described above. In addition, the allocation logic 408 deallocates (block 828, FIG. 8) the foreground TCB allocated for the safe data commit process directed to the particular RAID storage rank upon completion of the destaging operation.

Once it is determined (block 712, FIG. 7, block 810, FIG. 8) that all entries of the cache directory portion have been examined as described above, the distributed safe data commit logic 40 returns (block 860, FIG. 8) to release (block 720, FIG. 7) the scan TCB allocated for scanning the cache directory portion. As described above, allocation logic 408 (FIG. 4) further determines (block 724, FIG. 7) whether all scan operations of the cache directory have been completed such that all cache directory chunks or portions have been scanned. If not, the allocation logic 408 (FIG. 4) further determines (block 716, FIG. 7) whether all the scan TCBs which were allocated (block 704) are in use and assigns (block 708) any unused allocated scan TCBs. Once it is determined (block 724) that the scan of the cache directory is complete. the scan TCBs may be deallocated (block 730, FIG. 7) by the allocation logic 408.

It is seen from the above that in one aspect of distributed safe data commit operations in accordance with the present description, a maximum number of background TCBs are initially allocated instead of foreground TCBs. It is recognized that the allocation of background TCBs by the safe data commit process may slow background operations but it is recognized herein that slowing of background operations instead of host I/O operations may be advantageous in many applications. Accordingly, as background TCBs are allocated instead of foreground TCBs for a particular RAID storage rank up to a predetermined limit, the impact of the safe data commit operations upon host-initiated I/O operations such as read operations may be reduced or eliminated.

In this manner, allocation of foreground TCBs which may slow host I/O operations, may be deferred until the predetermined limit for background TCBs is reached. However, because the allocation of foreground TCBs to a particular RAID storage array is also limited to a predetermined limit, the impact of allocation of foreground TCBs upon host I/O may be reduced as well. It is appreciated that other features may be realized, depending upon the particular application.

Figure 9:
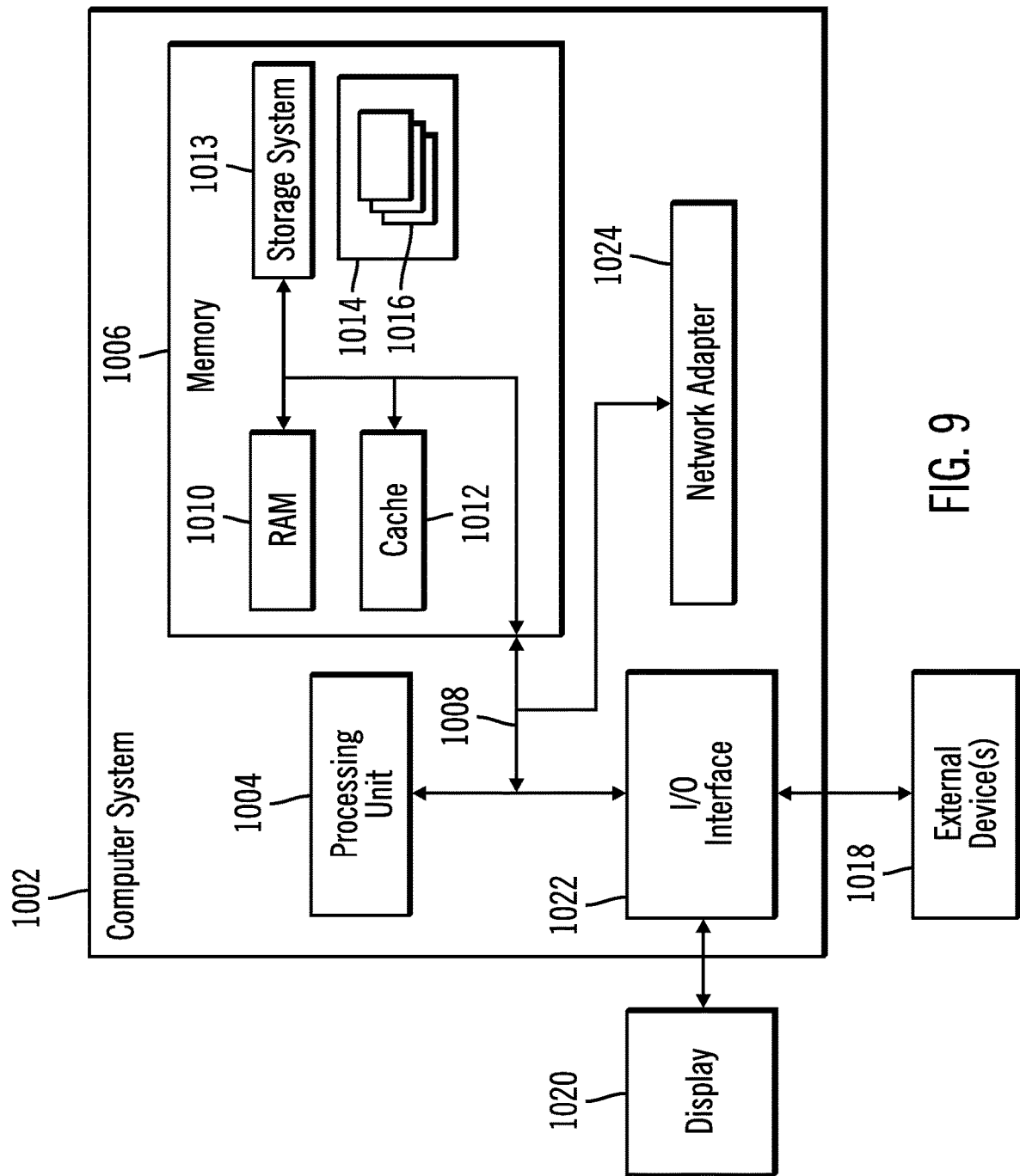
FIG. 9 illustrates a computer embodiment employing distributed safe data commit in a data storage system in accordance with the present description.

The computational components of the figures may each be implemented in one or more computer systems, such as the computer system 1002 shown in FIG. 9. Computer system/server 1002 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1002 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, the computer system/server 1002 is shown in the form of a general-purpose computing device. The components of computer system/server 1002 may include, but are not limited to, one or more processors or processing units 1004, a system memory 1006, and a bus 1008 that couples various system components including system memory 1006 to processor 1004. Bus 1008 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1002 typically includes a variety of computer system readable media. Such media may be any available media that is accessible by computer system/server 1002, and it includes both volatile and non-volatile media, removable and non-removable media.

System memory 1006 can include computer system readable media in the form of volatile memory, such as random access memory (RAM) 1010 and/or cache memory 1012. Computer system/server 1002 may further include other removable/non-removable, volatile/non-volatile computer system storage media. By way of example only, storage system 1013 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1008 by one or more data media interfaces. As will be further depicted and described below, memory 1006 may include at least one program product having a set (e.g., at least one) of program modules that are configured to carry out the functions of embodiments of the invention.

Program/utility 1014, having a set (at least one) of program modules 1016, may be stored in memory 1006 by way of example, and not limitation, as well as an operating system, one or more application programs, other program modules, and program data. Each of the operating system, one or more application programs, other program modules, and program data or some combination thereof, may include an implementation of a networking environment. The components of the computer system 1002 may be implemented as program modules 1016 which generally carry out the functions and/or methodologies of embodiments of the invention as described herein. The system of FIG. 1 may be implemented in one or more computer systems 1002, where if they are implemented in multiple computer systems 1002, then the computer systems may communicate over a network.

Computer system/server 1002 may also communicate with one or more external devices 1018 such as a keyboard, a pointing device, a display 1020, etc.; one or more devices that enable a user to interact with computer system/server 1002; and/or any devices (e.g., network card, modem, etc.) that enable computer system/server 1002 to communicate with one or more other computing devices. Such communication can occur via Input/Output (I/O) interfaces 1022. Still yet, computer system/server 1002 can communicate with one or more networks such as a local area network (LAN), a general wide area network (WAN), and/or a public network (e.g., the Internet) via network adapter 1024. As depicted, network adapter 1024 communicates with the other components of computer system/server 1002 via bus 1008. It should be understood that although not shown, other hardware and/or software components could be used in conjunction with computer system/server 1002. Examples, include, but are not limited to: microcode, device drivers, redundant processing units, external disk drive arrays, RAID systems, tape drives, and data archival storage systems, etc.

The reference characters used herein, such as i, j, and n, are used to denote a variable number of instances of an element, which may represent the same or different values, and may represent the same or different value when used with different or the same elements in different described instances.

The present invention may be a system, a method, and/or a computer program product. The computer program product may include a computer readable storage medium (or media) having computer readable program instructions thereon for causing a processor to carry out processor operations in accordance with aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for use with a host and a data storage device having a plurality of processing units, task control data structures, a cache, a cache directory and a plurality of units of storage in which each unit of storage has a plurality of subunits of storage, wherein the computer program product comprises a computer readable storage medium having program instructions embodied therewith, the program instructions executable by a processor of the data storage device to cause processor operations, the processor operations comprising:

safe data commit processing a cache to ensure destaging to storage of data written to the cache prior to a safe data commit scan start time, the safe data commit processing including:
identifying a subunit of storage for which there is data stored in cache which has not yet been destaged for storage to the subunit of storage of a unit of storage;
identifying the unit of storage of the identified subunit of storage; and
allocating a task control data structure of a first type to destage the data of the identified subunit of storage to the unit of storage in a destage operation unassociated with host input/output operations, in response to a total of the task control data structures of the first type allocated to the identified unit of storage of the identified subunit of storage remaining within a first task control block (TCB) type allocation limit imposed for a total of task control data structures of the first type allocated to the identified unit of storage;
wherein the task control data structure of the first type is a background task control block (TCB) unassociated with host input/output operations and excludes a foreground task control block (TCB) otherwise associated with host input/output operations so that allocation of background TCBs is prioritized over allocation of foreground TCBs for destage operations of the safe data commit process for the identified unit of storage; and
the safe data commit processing further including allocating a task control data structure of a second type to destage the data of the identified subunit of storage to the unit of storage in a destage operation unassociated with host input/output operations, in response to a total of the task control data structures of the first type allocated to the identified unit of storage of the identified subunit of storage reaching the first TCB type allocation limit imposed for a total of task control data structures of the first type allocated to the identified unit of storage wherein the task control data structure of the second type is a foreground task control block (TCB) associated with host input/output operations unless the identified subunit of storage has reached the first TCB type allocation limit imposed for the total of task control data structures of the first type allocated to the identified unit of storage so that a foreground task control block (TCB) is allocated to destage the data of the identified subunit of storage to the unit of storage in a destage operation unassociated with host input/output operations, instead of being allocated for an operation associated with an input/output operation from a host.

2. The computer program product of claim 1 wherein the unit of storage is a RAID array of storage devices and the subunit of storage is a track of the RAID array of storage devices.

3. The computer program product of claim 1 wherein the operations further comprise destaging data stored in the cache to the identified subunit of storage of the identified unit of storage using the allocated task control data structure, and deallocating the allocated task control data structure in association with completion of destaging data stored in the cache to the identified subunit of storage of the identified unit of storage using the allocated task control data structure.

4. The computer program product of claim 1 wherein the allocating a task control data structure of a second type to destage the data of the identified subunit of storage to the unit of storage, includes placing a request for allocation of a task control data structure of the second type in a queue to await execution in response to a total of the task control data structures of the second type allocated to the identified unit of storage of the identified subunit of storage reaching a second TCB type allocation limit imposed for a total of task control data structures of the second type allocated to the identified unit of storage.

5. The computer program product of claim 1 wherein the operations further comprise:
   allocating a plurality of scan task control blocks for a plurality of processing units of a storage system wherein a total of the allocated plurality of scan task control blocks is a function of a total number of processing units of the storage system; and
   assigning an allocated scan task control block to a processing unit of the storage system to scan an assigned portion of a directory data structure for subunits of storage for which there is data stored in cache which has not yet been destaged for storage to the subunit of storage of a unit of storage wherein identifying a subunit of storage for which there is data stored in cache which has not yet been destaged for storage includes scanning the assigned portion of the directory data structure for subunits of storage for which there is data stored in cache using the assigned allocated scan task control block.

6. A storage controller for use with a plurality of units of storage in which each unit of storage has a plurality of subunits of storage, comprising:
   a cache; and
   distributed safe data commit logic having at least one of software, firmware and hardware wherein said at least one of said distributed safe data commit logic is configured to destage data stored in the cache which has not yet been destaged for storage to an associated subunit of storage of a unit of storage to ensure destaging to storage of data written to the cache prior to a safe data commit scan start time, the distributed safe data commit logic including:
      scan logic configured to identify a subunit of storage for which there is data stored in cache which has not yet been destaged for storage to the associated subunit of storage of a unit of storage; and
   allocation logic having at least one of software, firmware and hardware wherein said at least one of said allocation logic is configured to identify the unit of storage of the identified subunit of storage and to allocate a task control data structure of a first type to destage the data of the identified subunit of storage to the unit of storage in a destage operation unassociated with host input/output operations, in response to a total of the task control data structures of the first type allocated to the identified unit of storage of the identified subunit of storage remaining within a first task control block (TCB) type allocation limit imposed for a total of task control data structures of the first type allocated to the identified unit of storage wherein the task control data structure of the first type is a background task control block (TCB) unassociated with host input/output operations and excludes a foreground task control block (TCB) otherwise associated with host input/output operations so that allocation of background TCBs is prioritized over allocation of foreground TCBs for destage operations for the identified unit of storage, and to allocate a task control data structure of a second type to destage the data of the identified subunit of storage to the unit of storage in a destage operation unassociated with host input/output operations, in response to a total of the task control data structures of the first type allocated to the identified unit of storage of the identified subunit of storage reaching the first TCB type allocation limit imposed for a total of task control data structures of the first type allocated to the identified unit of storage wherein the task control data structure of the second type is a foreground task control block (TCB) associated with host input/output operations unless the identified subunit of storage has reached the first TCB type allocation limit imposed for the total of task control data structures of the first type allocated to the identified unit of storage so that a foreground task control block (TCB) is allocated to destage the data of the identified subunit of storage to the unit of storage in a destage operation unassociated with host input/output operations, instead of being allocated for an operation associated with an input/output operation from a host.

7. The storage controller of claim 6 wherein the unit of storage is a RAID array of storage devices and the subunit of storage is a track of the RAID array of storage devices.

8. The storage controller of claim 6 wherein the distributed safe data commit logic further includes destage logic configured to destage data stored in the cache to the identified subunit of storage of the identified unit of storage using the allocated task control data structure, and wherein the allocation logic is further configured to deallocate the allocated task control data structure in association with completion of destaging data stored in the cache to the identified subunit of storage of the identified unit of storage using the allocated task control data structure.

9. The storage controller of claim 6 wherein the allocation logic further includes a queue memory configured to store a queue of requests for allocation of task control data structures of the second type and wherein the allocation logic is further configured to place requests for allocation of task control data structure in the queue memory to await execution in response to a total of the task control data structures of the second type allocated to the identified unit of storage of the identified subunit of storage reaching a second TCB type allocation limit imposed for a total of task control data structures of the second type allocated to the identified unit of storage.

10. The storage controller of claim 6 further comprising a plurality of processing units and wherein the allocation logic is further configured to allocate a plurality of scan task control blocks for the plurality of processing units of the storage controller wherein a total of the allocated plurality of scan task control blocks is a function of a total number of processing units of the storage controller, and to assign an allocated scan task control block to a processing unit of the storage controller to scan an assigned portion of a directory data structure for subunits of storage for which there is data stored in cache wherein the scan logic is further configured to scan the assigned portion of the directory data structure for subunits of storage for which there is data stored in cache using the assigned allocated scan task control block.

11. A method for use with a plurality of units of storage in which each unit of storage has a plurality of subunits of storage, comprising:
    safe data commit processing a cache to ensure destaging to storage of data written to the cache prior to a safe data commit scan start time, the safe data commit processing including:
        identifying a subunit of storage for which there is data stored in cache which has not yet been destaged for storage to the subunit of storage of a unit of storage;
        identifying the unit of storage of the identified subunit of storage;
        allocating a task control data structure of a first type to destage the data of the identified subunit of storage to the unit of storage in a destage operation unassociated with host input/output operations, in response to a total of the task control data structures of the first type allocated to the identified unit of storage of the identified subunit of storage remaining within a first task control block (TCB) type allocation limit imposed for a total of task control data structures of the first type allocated to the identified unit of storage wherein the task control data structure of the first type is a background task control block (TCB) unassociated with host input/output operations and excludes a foreground task control block (TCB) otherwise associated with host input/output operations so that allocation of background TCBs is prioritized over allocation of foreground TCBs for destage operations of the safe data commit process for the identified unit of storage; and
        allocating a task control data structure of a second type to destage the data of the identified subunit of storage to the unit of storage in a destage operation unassociated with host input/output operations, in response to a total of the task control data structures of the first type allocated to the identified unit of storage of the identified subunit of storage reaching the first TCB type allocation limit imposed for a total of task control data structures of the first type allocated to the identified unit of storage wherein the task control data structure of the second type is a foreground task control block (TCB) associated with host input/output operations unless the identified subunit of storage has reached the first TCB type allocation limit imposed for the total of task control data structures of the first type allocated to the identified unit of storage so that a foreground task control block (TCB) is allocated to destage the data of the identified subunit of storage to the unit of storage in a destage operation unassociated with host input/output operations, instead of being allocated for an operation associated with an input/output operation from a host.

12. The method of claim 11 wherein the unit of storage is a RAID array of storage devices and the subunit of storage is a track of the RAID array of storage devices.

13. The method of claim 11 further comprising destaging data stored in the cache to the identified subunit of storage of the identified unit of storage using the allocated task control data structure, and deallocating the allocated task control data structure in association with completion of destaging data stored in the cache to the identified subunit of storage of the identified unit of storage using the allocated task control data structure.

14. The method of claim 11 wherein the allocating a task control data structure of a second type to destage the data of the identified subunit of storage to the unit of storage, includes placing a request for allocation of a task control data structure of the second type in a queue to await execution in response to a total of the task control data structures of the second type allocated to the identified unit of storage of the identified subunit of storage reaching a second TCB type allocation limit imposed for a total of task control data structures of the second type allocated to the identified unit of storage.

15. The method of claim 11 further comprising:
    allocating a plurality of scan task control blocks for a plurality of processing units of a storage system wherein a total of the allocated plurality of scan task control blocks is a function of a total number of processing units of the storage system; and
    assigning an allocated scan task control block to a processing unit of the storage system to scan an assigned portion of a directory data structure for subunits of storage for which there is data stored in cache which has not yet been destaged for storage to the subunit of storage of a unit of storage wherein identifying a subunit of storage for which there is data stored in cache which has not yet been destaged for storage includes scanning the assigned portion of the directory data structure for subunits of storage for which there is data stored in cache using the assigned allocated scan task control block.

* * * * *